United States Patent
Zoppitelli et al.

(10) Patent No.: US 6,824,096 B2
(45) Date of Patent: Nov. 30, 2004

(54) DEVICE FOR CONTROLLING THE PITCH OF THE BLADES OF A CONVERTIBLE AIRCRAFT ROTOR

(75) Inventors: Elio Zoppitelli, Velaux (FR); Etienne Rampal, Marseilles (FR); Eric Cornille, Salon (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/392,645

(22) Filed: Mar. 20, 2003

(65) Prior Publication Data

US 2003/0183722 A1 Oct. 2, 2003

(30) Foreign Application Priority Data

Mar. 29, 2002 (FR) .............................. 02 04006

(51) Int. Cl.⁷ .............................................. B64C 27/54
(52) U.S. Cl. ................................ 244/17.25; 244/17.27; 244/7 R
(58) Field of Search ........................... 244/17.25, 17.27, 244/6, 7 R; 416/114, 115, 134 A, 148

(56) References Cited

U.S. PATENT DOCUMENTS

| | | | |
|---|---|---|---|
| 2,428,200 A | * 9/1947 | Campbell | 416/114 |
| 2,620,888 A | * 12/1952 | Avery | 416/114 |
| 2,971,584 A | 2/1961 | Schon | |
| 3,451,484 A | 6/1969 | Sawicki et al. | |
| 5,624,232 A | * 4/1997 | Certain | 416/114 |
| 6,033,182 A | * 3/2000 | Rampal | 416/114 |
| 6,260,793 B1 | 7/2001 | Balayn et al. | |
| 6,276,633 B1 | 8/2001 | Balayn et al. | |
| 6,325,326 B1 | * 12/2001 | Pancotti | 244/17.25 |

* cited by examiner

Primary Examiner—Tien Dinh
(74) Attorney, Agent, or Firm—Sturm & Fix LLP

(57) ABSTRACT

A pitch control device for a blade of a tilting rotor of a convertible aircraft. The pitch control device is external to a rotor hub which is driven in rotation by a mast and connected to the latter by a mechanism for tilting the hub as a whole, each blade is connected to the hub by a coupling for retaining and hingeing the blade in pitch about its pitch change axis. The device includes a pitch change lever, integral in rotation with its blade root about its axis, a pitch control rod, a bellcrank pivoting about a pin on a drive plate integral in rotation with the mast, and to which the pitch control rod is hinged, the bellcrank being also hinged to a link rod connected to the pitch change lever.

12 Claims, 5 Drawing Sheets

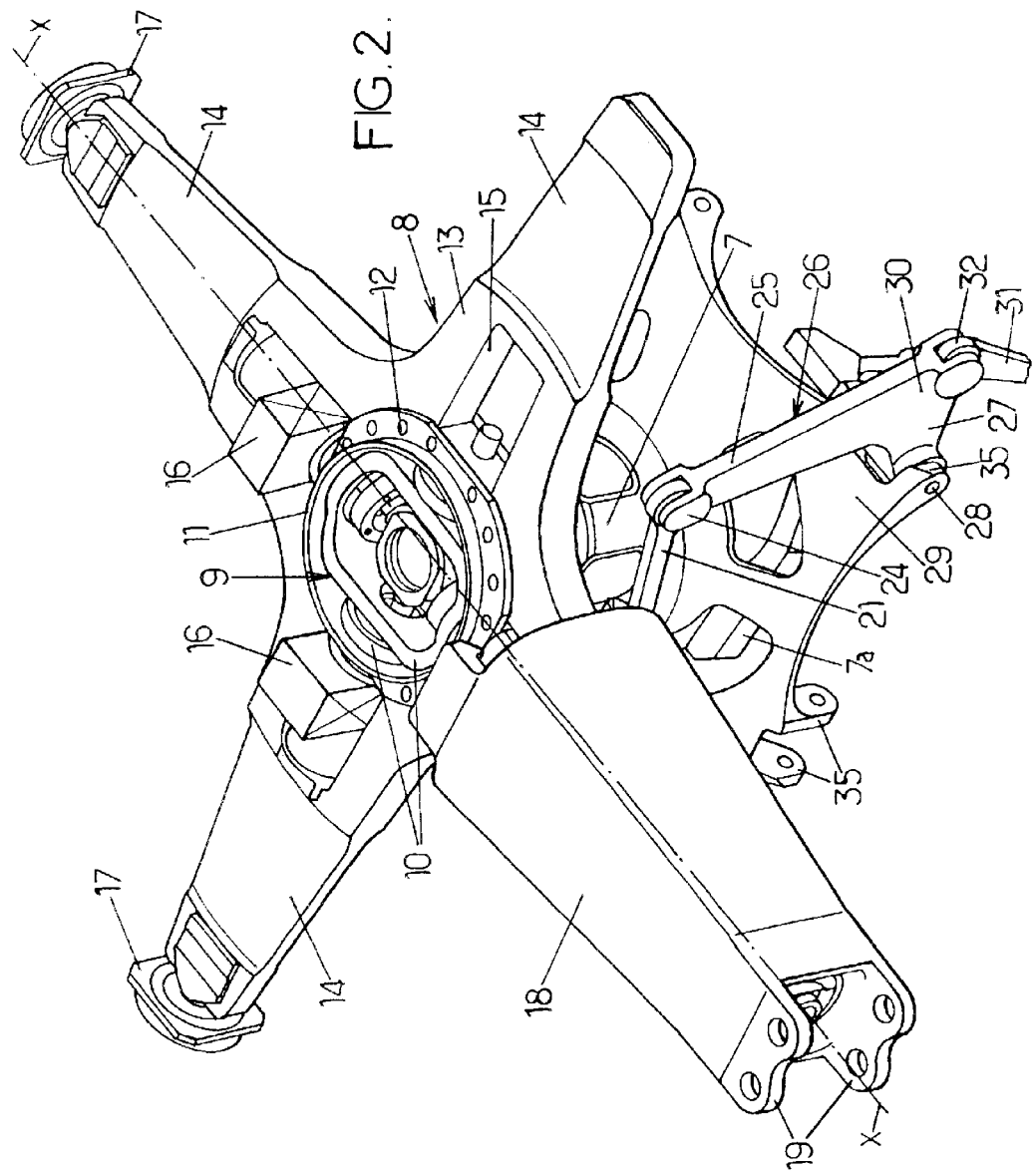

DEVICE FOR CONTROLLING THE PITCH OF THE BLADES OF A CONVERTIBLE AIRCRAFT ROTOR

FIELD OF THE INVENTION

The invention relates to a device for controlling the pitch of the blades of a convertible aircraft rotor of the known type supporting at least two wings, generally fixed, and at least one tilting rotor.

A particularly advantageous application of the pitch control device according to the invention consists in fitting it to constant velocity drive tilting rotors for convertible aircraft, particularly of the type known and described in U.S. Pat. Nos. 6,276,633, 6,260,793 and 6,607,161 to which reference may advantageously be made for further details.

Briefly, such a convertible aircraft with tilting rotors generally comprises, as shown schematically in FIG. 1, a fuselage 1, of the aircraft fuselage type, supporting two fixed wings 2, for example high wings, raised with respect to the fuselage 1, each wing 2 itself supporting a power pod 3, housing a power unit driving in rotation a rotor 4, represented schematically by the plane of rotation of the rotor blades, via a transmission (not shown in FIG. 1), a rear reduction gear unit of which is directly driven by the power unit and housed like the latter in the stationary rear part 5 of the power pod 3. The front part 6 of the power pod, housing a rotor mast and a rotor hub, as well as a front reduction gear unit driving the rotor mast in rotation, is mounted so as to pivot with the rotor 4, so that it can pivot from an aeroplane configuration, in which the rotor 4 operates as a propeller at the front of an engine pod 5–6 facing into the relative wind, to a helicopter configuration, in which the rotor 4' operates as a helicopter main lifting rotor at the upper end of the front pivoting part of the pod in the upright position 6' above the corresponding wing 2, this latter configuration being used for take-off and landing of the convertible aircraft which, after transition from the helicopter configuration to the aeroplane configuration, is able to move in forward flight like an aircraft. As a variant, the pods 3 may pivot totally with the rotor 4 with respect to the fixed wings 2.

BACKGROUND TO THE INVENTION

The tilting rotors of convertible aircrafts differ from the rotors, particularly main rotors, of helicopters by the following characteristics. The range of control of the blades of these rotors in collective pitch is very large, due to the fact that the aircraft must be able to fly not only as a helicopter but also as an aeroplane; the power for controlling them must remain low, which necessitates a very small flapping eccentricity (i.e. the distance between the flapping axis of the blades and the axis of rotation of the rotor); the rotors, and their hubs in particular, must have high rigidity in the plane of the rotor, in order to obtain a high drag mode, to avoid the dangers of ground resonance; and they have a high level of cyclic flapping.

To meet these different requirements, it has already been proposed that such convertible aircrafts be equipped with tilting rotors of the gimbal type, with zero flapping eccentricity, on which the hub is driven in rotation by the mast and connected to the latter by tilting means, allowing the hub, and therefore the rotor, to tilt as a whole about a flapping axis passing through the axis of the mast and perpendicular to the latter, and being able to occupy any position extending in any direction about the axis of the mast. On such rotors, the absolute requirement that the pitch-flap coupling, commonly referred to as the delta-3 relation, should have a slightly negative value for the control of such a tilting rotor, has led the designers of such rotors to adopt three-bladed rotors, so that a conventional pitch control device is retained, similar to those fitted to helicopter main rotors, with a swashplate mechanism, in which the oscillations of a rotating star control the movements, substantially along the axis of rotation of the rotor mast, of pitch control rods, each of which is hinged to the end of a pitch change lever integral in rotation with the root of a corresponding blade about the longitudinal pitch change axis of this blade, the pitch change lever projecting on the leading edge or trailing edge side of this blade, in order that the distance between the flapping axis and the centre of the pitch change lever hinge to the corresponding pitch control rod is short.

In actual practice, this condition of a short distance between the flapping axis and the centre of the pitch change lever hinge to the control rod can be met on a three-bladed rotor with conventional pitch change levers, i.e. levers placed substantially in the plane of the rotor disc, since the space available between successive blade roots is generally sufficient to accommodate such pitch change levers.

On the other hand, on a rotor equipped with at least four blades, the flapping axis of a blade corresponds substantially with the longitudinal axis of the following blade, so that for reasons of geometry and interference the pitch change levers cannot be positioned to satisfy the above conditions.

SUMMARY OF THE INVENTION

The problem addressed by the present invention is to propose a device for controlling the pitch of the blades of a gimbal-type rotor as defined above, preferably rigid in plane, and which may comprise at least three blades, but preferably four blades or more, while meeting the strict requirement for a slightly negative delta-3 value.

To this end, there is provided a device for controlling the pitch of blades of a convertible aircraft tilting rotor, for a rotor comprising:

a rotor mast having a base and a longitudinal axis, the rotor mast being capable of being driven in rotation by said base about said longitudinal axis, a hub, driven in rotation by the mast, and connected to the masse by a tilting arrangement, allowing the hub as a whole to tilt about any flapping axis passing through the axis of the mast and perpendicular to the axis of the mast, and at least two blades, each of which is linked to the hub by a coupling retaining and hingeing said blade in pitch about a longitudinal pitch change axis of said blade, which pitch change axis extends in a plane of rotation of the rotor, wherein the pitch control device is external to the hub and comprises for each blade of the rotor:

a pitch change lever, integral in rotation with a root of said blade about said pitch change axis, and projecting on a side of a plane of rotation of the rotor which faces towards the base of the mast, a pitch control rod which is movable in a direction substantially parallel to the longitudinal axis of rotation of the mast, a bellcrank mounted so as to pivot about a pivot axis substantially contained in a radial plane relative to the longitudinal axis of rotation of the mast, on a fixed point of a drive plate, integral in, rotation with the mast, said pitch control rod being hinged to said bellcrank, at least so as to pivot about an axis substantially parallel to the pivot axis of the bellcrank on the drive plate, and at a point offset radially outwardly of said pivot axis relative to the longitudinal axis of rotation of the mast, and a link rod, hinged at least so as to pivot at one end to said pitch change lever, about an axis substantially parallel to said pitch change axis and, at an other end of said link rod to the bellcrank, at a fixed point on the bellcrank located between said plane of rotation of the rotor and the point of hingeing of the bellcrank to the drive plate, so that said link rod is slightly inclined to any radial plane relative to the longitudinal axis of rotation of the mast, and that the bellcrank converts any movement of said pitch control rod into movement of said link rod in a direction substantially transverse to the direction of the longitudinal axis of the mast.

An essential advantage of this pitch control device is that an angle of inclination of said link rod to any radial plane (perpendicular to the axis of the mast) may be chosen to correspond to a desired pitch-flap relation (delta-3) for the corresponding blade.

Also advantageously, said link rod remains one of substantially parallel to and slightly inclined to any radial plane relative to the axis of rotation of the mast, when said blade performs angular deflection movements within its pitch range.

Moreover, the angle of inclination of said link rod to any radial plane, perpendicular to the axis of the mast, may vary so as to obtain pitch-flap coupling (delta-3) according to a law determined as a function of pitch angle of the blade, when the latter performs angular deflection movements in flapping.

In an advantageously simple form of structural embodiment, the bellcrank is substantially L-shaped, hinged at the elbow to the pitch control rod, at one end of one of its arms to the drive plate, and at one end of its other arm to the link rod. The overall size of the bellcrank is thus limited, while allowing satisfactory positioning of the pitch control rod and link rod hinges on the bellcrank, and of the latter on the drive plate, so as to obtain the slight inclination desired of the link rod to the radial plane, and therefore the desired delta-3 relation.

The link rod may thus, for different flapping values, and as a function of the pitch of the corresponding blade, exhibit a change in its inclination relative to any radial plane relative to the axis of the mast which has the effect that this inclination, the slope of which with respect to the radial plane (relative to the axis of the mast) has an effect on the delta-3 relation obtained, remains within a limited range of angular values, less than 20°, for a pitch range extending substantially from −10° to 60°, and flapping values varying from −11° to +11°.

This slight inclination of the link rod to any radial plane relative to the axis of the mast, and in a substantially transverse direction relative to the direction of the axis of the mast, is also favourable in terms of size, as well as in terms of final adjustments, since easily implemented changes in the positions of the bellcrank and the link rod, and in particular of their hinges to each other, and also to the pitch change lever for the link rod, and to the pitch control rod and the drive plate, for the bellcrank, make it easy to test different configurations of the pitch-flap relation, in order to obtain the desired delta-3 value by appropriate inclination of the link rod.

Due to the distance between the hinge of the link rod to the pitch change lever and the flapping axis, this inclination varies with the cyclic flapping, which induces a pitch-flap relation which depends on the cyclic flapping. However, as this variation in inclination is opposite in sign and substantially equal in amplitude for two diametrically opposite blades, for example in a four-bladed rotor, the result is a pitch-flap relation for the cyclic mode which is substantially constant, when considered relative to the tilting hub and to the rotor as a whole. In concrete terms, a disturbance in cyclic flapping for a rotor subjected to substantial cyclic flapping loads causes a different variation in pitch for two opposite blades, but consideration as a whole of the variation in aerodynamic moment applied at the centre of the rotor head shows that this moment remains very substantially proportional to the disturbance in cyclic flapping, and independent of cyclic flapping.

The arrangement of this pitch control device with, for each blade, a link rod substantially in the radial plane relative to the axis of the mast, is more particularly suited to a rotor rigid in drag, for which drag movement of the blades is very slight, which limits the pitch variations induced by the pitch-drag coupling. The limitation of the pitch variations induced by this pitch-drag coupling may be optimised by arranging the end of the link rod hinged to the corresponding pitch change lever in the plane perpendicular to the pitch hinge axis and containing the vibration node of the cyclic drag mode.

In addition, the arrangement of the link rod, projecting from the leading edge or from the trailing edge of the corresponding blade, starting from the pitch change lever of this blade, may be chosen according to the desired sign of the pitch-drag coupling or relation for the cyclic and collective drag modes.

Also advantageously, to avoid unwanted types of coupling as far as possible, the pivot axes of the bellcrank respectively on the drive plate, on the pitch control rod, and on the link rod are substantially parallel with each other, and also to the pitch change axis of the corresponding blade, in the neutral position of the hub.

In general terms, the bellcrank and the link rod, and also preferably the pitch control rod, move substantially in a plane parallel to the longitudinal axis of the mast and perpendicular to the pivot axis of the bellcrank on the drive plate and substantially perpendicular to the pitch change axis of said blade.

Also advantageously, to keep a small delta-3 value with low eccentricity and any number of blades, the pitch change lever projects towards the base of the mast at a radially inner end, relative to the axis of the mast, of a blade cuff, rigid in torsion and connected in torsion to the root of the corresponding blade about the pitch change axis, and surrounding said coupling for retaining and hingeing said blade in pitch. In this way, the pitch control takes place close to the hub and to the axis of the mast, and this pitch control device is directly compatible, because of the presence of the cuffs, with rotor hubs of the type with a plate in the form of a star comprising as many outward-extending arms as the rotor has blades, each arm of the hub supporting the coupling for retaining and hingeing a corresponding blade in pitch, these hubs being known for providing good rigidity in drag while exhibiting low rigidity in flapping, by the bending of the arms of the hub perpendicularly to their plane.

To ensure proper guidance of the bellcrank in its pivoting points on the drive plate, and therefore also corresponding proper guidance of the ends of the pitch control rod and of the link rod which are hinged to this bellcrank, the latter is advantageously mounted so as to pivot in a yoke projecting outwardly on the drive plate. On the other hand, the link rod is advantageously hinged to the pitch change lever and to the bellcrank by ball joint connections, and/or the bellcrank is hinged to the pitch control rod by a ball joint connection.

BRIEF DESCRIPTION OF THE DRAWINGS

Other advantages and characteristics of the invention will emerge from the description given below, by way of a non-limiting example, of an embodiment described with reference to the appended drawings in which:

FIG. 2 is a view in perspective from the side and from above of the head of a four-bladed rotor for the convertible aircraft in FIG. 1, equipped with a pitch control device according to the invention, associated with a hub having a star-shaped plate with four arms and of the gimbal type.

DETAILED DESCRIPTION OF SPECIFIC EMBODIMENTS

Figure 1:
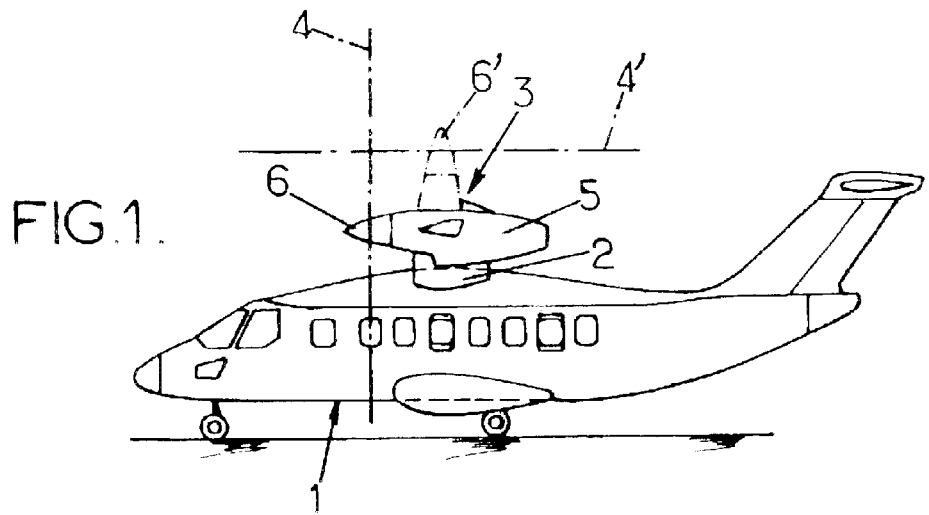
FIG. 1 is a schematic view, in side elevation, of a convertible aircraft with tilting rotors designed to be equipped with devices for controlling the pitch of the blades according to the invention.
Figure 3:
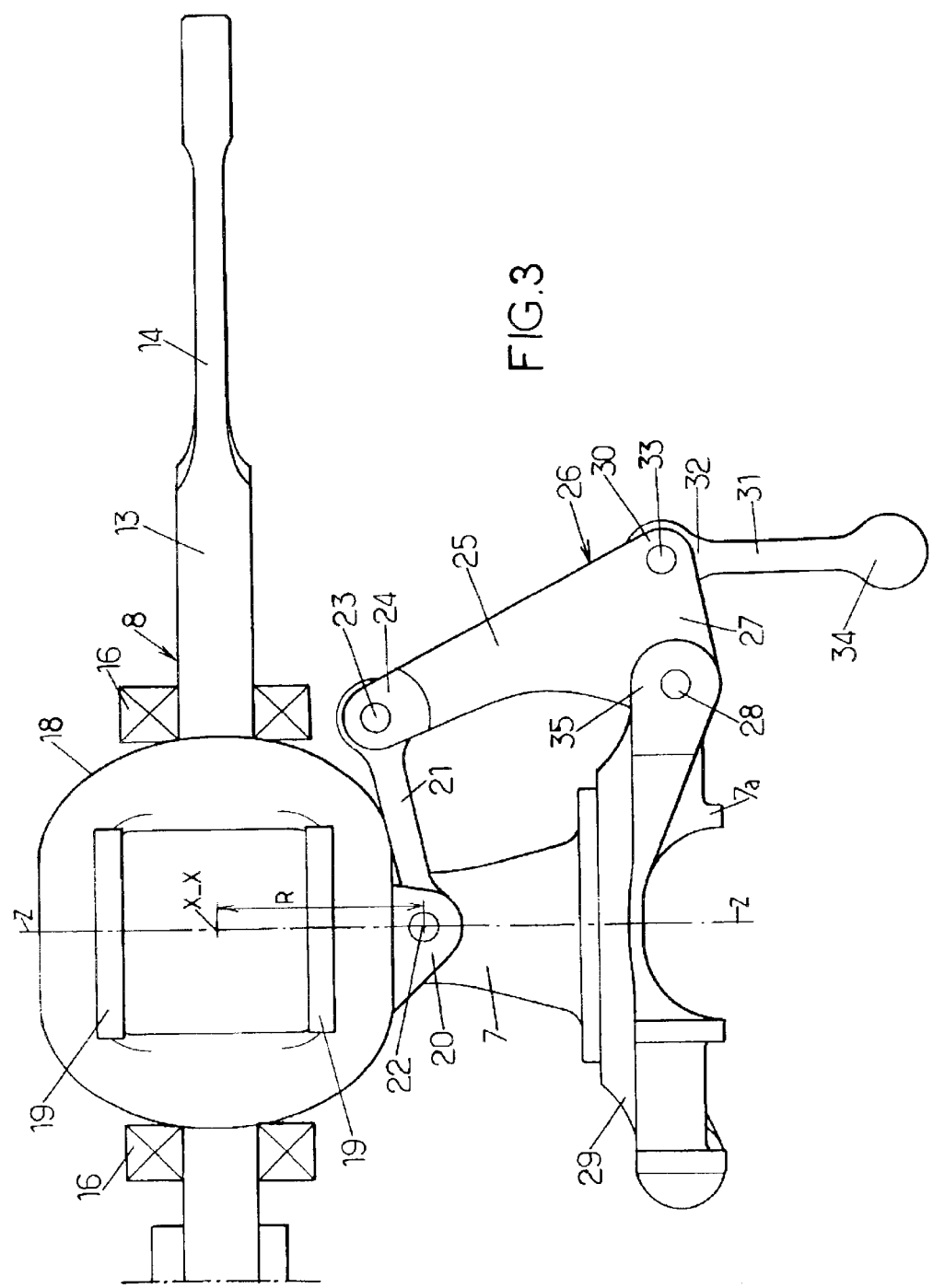
FIG. 3 is a schematic view in side elevation, along the pitch change axis of a blade, of the rotor head in FIG. 2.

The four-bladed rotor head in FIGS. 2 and 3, for fitting to a tilting rotor 4 of a convertible aircraft according to FIG. 1, comprises a rotor mast 7, driven in rotation by its base 7a about its longitudinal axis Z—Z, and on which the opposite axial end to the base 7a is connected to a hub 8 by a device 9 providing constant velocity drive and tilting as a whole about any flapping axis intersecting the axis Z—Z and perpendicular to the latter, and which may extend in any direction about the axis Z—Z, this constant velocity drive and tilting device 9 being, for example, a double-gimbal device as described in U.S. Pat. No. 6,695,259; housed in a hub casing 11 attached by a ring of axial screws 12 to a hub plate 13.

In outline, this double-gimbal device 10 comprises two gimbals each mounted so as to pivot about one respectively of two diametral drive arms of the mast 7, perpendicular to each other and to the axis Z—Z, and each of which drives the corresponding gimbal in rotation about this axis Z—Z, each of the gimbals being in addition hinged to the hub casing 11 by two ball joint connections diametrically opposite relative to the axis Z—Z and centred substantially in a plane passing through the axis Z—Z and through the diametral axis about which the other gimbal is mounted so as to pivot.

The combined tilting and constant velocity drive device 9 thus allows the hub 8 to be driven in rotation by the mast 7 about a geometrical axis of rotation of the hub 8 which remains perpendicular to the plane of this hub and therefore can be inclined, with the latter, in any direction about the axis Z—Z.

The hub plate 13 is a star-shaped plate comprising as many outward extending arms 14 as the rotor has blades, namely four in this example, each of the arms 14 supporting means of retaining and hingeing a blade in pitch about the longitudinal pitch change axis X—X of this blade, this axis X—X extending in the plane of rotation of the rotor, defined substantially by the pitch change axes X—X of all the blades, which axes X—X intersect substantially on the axis of rotation Z—Z and are substantially perpendicular to the latter, when the rotor is at rest or in a neutral position, the plane of rotation of the rotor, being then substantially perpendicular to the axis Z—Z of the mast 7.

The hub plate 13 has a central opening, coaxial with the axis Z—Z, through which the mast 7 runs, and also, in each of its arms 14, a recess 15, made in the part of the arm 14 which is adjacent to the central portion of the hub plate 13, and in which is housed a part 16 of the means for retaining and hingeing the corresponding blade, another part 17 of which is attached to the outer end of the corresponding arm 14. These means 16 and 17 for retaining and hingeing in pitch are surrounded by a cuff 18 to which these means 16 and 17 are connected so as to allow the cuff 18 to be hinged by pivoting as a whole about the corresponding pitch change axis X—X, since this cuff 18 is rigid in torsion and integral in torsion with the root of a corresponding blade, by an outer radial yoke 19, and two blade pins (not shown) retaining the blade root (also not shown) in the yoke 19 of the corresponding cuff 18.

The cuff 18 is thus integral in torsion with a corresponding blade about the pitch change axis X—X of this blade, because of the means 16 and 17 for retaining and hingeing in pitch, which retain the blade and its cuff 18 on an arm 14 of the hub plate 13, made for example of composite material, and having high rigidity in drag, and at the same time good flexibility in flapping in each of its arms 14.

The device for controlling the pitch of each blade is a device external to the hub 8, rotating with the mast 7, and allowing the pitch of the blade cuff 18 to be controlled, due to the rigidity of this cuff 18 in torsion and to its being made integral in torsion with the root of the corresponding blade, this pitch control taking place, on the cuff 18, at a pitch change lever 20 which projects below the inner radial end (relative to the axis Z—Z) of the cuff 18, this pitch change lever 20 being aligned along the axis Z—Z and towards the base 7a of the mast 7, i.e. on the side of the plane of rotation of the hub 8 which is situated towards the base of the mast 7, as clearly shown in FIG. 3.

The pitch control device comprises a link rod 21 which is hinged so as to pivot at one end on the pitch change lever 20, about a pin 22 substantially parallel to the pitch change axis X—X of the cuff 18, preferably by a ball joint end fitting on is the rod 21, allowing slight deflection of this rod 21 relative to the lever 20 outside the plane perpendicular to the pitch change axis X—X and containing the lever 20. At its other end, the link rod 21 is also hinged so as to pivot, about a pin 23, substantially parallel to the pin 22 and the axis X—X, on the upper end 24 (in FIGS. 2 and 3) of one arm 25 of a bellcrank 26 which is substantially L-shaped, or more broadly of a general triangular shape, and which is hinged so as to pivot at the end of its other arm 27, and about a pin 28 also substantially parallel to the axis X—X and the pins 22 and 23, to a drive plate 29 attached to the mast 7 above its base 7a and integral in rotation with the mast 7 about the axis Z—Z.

In addition, the bellcrank 26 is also hinged so as to pivot, at its elbow 30, on the upper end 32 of a pitch control rod 31, about a pivot pin 33 which is also substantially parallel to the axis X—X and the pins 22, 23 and 28.

At its lower end 34, the pitch control rod 31 is connected, in a manner well-known in swashplate devices for controlling the pitch of helicopter main rotor blades, to a rotating star of such a device, which may be embodied according to different known configurations, for example using cardan joints, ball joints etc. By this known swashplate device, the pitch control rod 31 is moved substantially in the direction of the axis of rotation Z—Z of the mast 7, and the hingeing of its upper end 32 about the pin 33 to the elbow 30 of the bellcrank 26, and also the hingeing of the link rod 21 about the pin 23 to the upper end 24 of the arm 25 of the bellcrank 26 are also provided by ball joint connections, using ball joint end fittings, as explained above for the hingeing of the link rod 21 by a ball joint connection to the pitch change lever 20.

On the other hand, the arm 27 of the bellcrank 26 is mounted so as to pivot about the pin 28 in a yoke 35, the two cheeks of which project on one side of the drive plate 29.

By the upper end of the pitch control rod 31 and of the arm 25 of the elbow-shaped bellcrank 26 is meant the end of this rod 31 or of this arm 25 which is nearest the hub 8 and the plane of rotation of the rotor, while the lower end is the one situated at the opposite end, in the direction of the axis Z—Z.

As the cuff 18 and therefore also its pitch change lever 20 and the pin 22 are driven in flapping with the corresponding blade, and also with the hub 8 when the rotor tilts as a whole relative to the axis Z—Z of the mast 7, while the yoke 35 occupies a fixed position on the drive plate 29 rotating with the mast 7, this yoke 35 guides the pivoting of the bellcrank 26 about the pin 28 in a fixed position on the drive plate 29, and substantially contained in a radial plane relative to the axis Z—Z, i.e. a plane perpendicular to the axis Z—Z and running through the axis of the coaxial bores made in the cheeks of the yoke 35 to receive the pivot pin 28.

The pivot pin 28 is therefore substantially perpendicular to the axis Z—Z and substantially parallel to the plane passing through the axes Z—Z and X—X, and the pins 33 and 23 for pivoting the bell crank 26 respectively to the pitch control rod 31 and to the link rod 21 are each substantially parallel to the pin 28. The result of this is that the bellcrank 26 and the link rod. 21 move substantially in a plane parallel to the axis Z—Z of the mast 7 and perpendicular to the pin 28 pivoting the bellcrank 26 to the drive plate 29, and substantially perpendicular to the pitch change axis X—X of the corresponding blade, and this plane in which the bellcrank 26 and the link rod 21 move is close to the axis Z—Z of the mast 7, due to the fact that the pitch change lever 20 projects under the inner radial end (relative to the axis Z—Z) of the cuff 18.

In addition, as the pin 33 for pivoting the bellcrank 26 to the pitch control rod 31 is offset radially towards the outside of the pivot pin 28 relative to the plane passing through the axes X—X and Z—Z, and relative to this axis Z—Z, and as in addition the fixed point at the upper end 24 of the arm 25 of the bellcrank 26 to which the link rod 21 is hinged so as to pivot by the pin 23 is a point situated between the pin 28 hingeing the bellcrank 26 to the drive plate 29, on the one hand, and on the other, the plane of rotation of the rotor defined by the plane of the arms 14 of the star-shaped hub plate 13, the movement of the pitch control rod 31 in a direction substantially parallel to the axis Z—Z of rotation of the mast 7 is converted by the bellcrank 26 into a movement of the link rod 21 in a direction which is substantially transverse to the direction of the axis Z—Z of the mast 7. In addition, the geometry of the bell crank 26 and its dimensions, as well as those of the link rod 21 are chosen so that this rod 21 is slightly inclined to any radial plane, perpendicular to the axis Z—Z of the mast 7.

This position of the link rod 21 is favourable not only in terms of size, but above all because the slope of this rod 21, relative to any radial plane perpendicular to the axis Z—Z, or its angle of inclination to any radial plane, corresponds to the desired pitch-flap relation, termed the delta-3 relation. It will be recalled that the delta-3 relation, which defines the pitch-flap coupling, corresponds to the ratio of a variation in the pitch angle of the blade to the variation in the flap angle, which is at the origin of the variation in the pitch angle. The fact that the desired pitch-flap coupling value is obtained by means of the inclination of the link rod 21 to any radial plane perpendicular to the axis Z—Z is a crucial advantage, since, during final adjustments to the pitch control device, changing the geometry and/or dimensions and/or position of at least one of the hinge pins of the bellcrank 26 and of the link rod 21 makes it easy to test different configurations for which there are corresponding different small inclinations of the link rod 21, and therefore different values of the delta-3 relation.

In particular, matters may be contrived so that the link rod 21 remains substantially parallel to or slightly inclined to any radial plane relative to the axis Z—Z, when the corresponding blade performs angular deflections within its pitch range (collective and cyclic).

As the link rod 21 is aligned transversely to the direction of the axis Z—Z, in a plane parallel to the latter and substantially perpendicular to the pitch change axis X—X of the corresponding blade, the cyclic flapping causes a variation in the inclination of this rod 21, which induces a pitch-flap relation which depends on the cyclic flapping. However, as this variation in inclination is opposite in sign and of substantially equal amplitude for two blades diametrically opposite on the rotor, the result is a substantially constant pitch-flap relation for the cyclic mode, at the tilting hub 8. In reality, different pitch variations are caused on two diametrically opposite blades by a disturbance in cyclic flapping, when the rotor is subjected to large cyclic flapping loads. Nevertheless, the variation in the aerodynamic moment applied to the centre of the rotor head, considered as a whole, is such that this moment remains very substantially proportional to the disturbance in cyclic flapping, and independent of the cyclic flapping itself.

The pitch control device with bellcrank 26 and link rod 21, as described above, is more particularly suited to a rotor rigid in drag, for which the drag movement of the blades is very slight, which has the advantage of limiting the pitch variations induced by the pitch-drag coupling.

As a variant, in order to utilise this advantage to the full, the pin 22 hingeing one end of the link rod 21 to the pitch change lever 20 of the cuff 18 on the blade considered may be placed in a plane perpendicular to the axis X—X and containing the vibration node of the cyclic drag mode of this blade. In addition, the link rod 21 may extend on the trailing edge side of the blade (as in FIG. 3) or on the leading edge side, depending on whether a negative or positive pitch-drag relation is desired.

Figure 4:
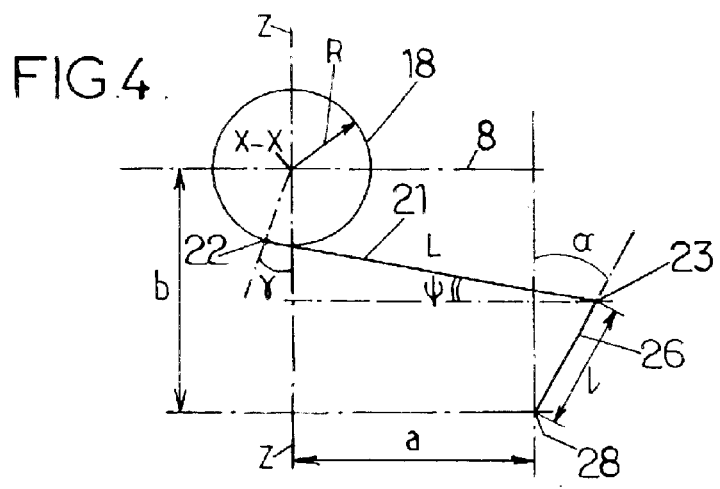
FIG. 4 is a diagram of the kinematic arrangement of the pitch control device of the rotor head in FIGS. 1 and 2, viewed in the same direction as FIG. 3, with an indication of the geometry parameters taken into account to calculate the length of the link rod, its inclination to a radial plane relative to the axis of the mast and the corresponding delta-3 relation.

FIG. 4 shows schematically the kinematic arrangements of the pitch control device in FIGS. 2 and 3, and in the figure a represents the distance from the hinge pin 28 (of the bellcrank 26 to the drive plate 29 ) to the axis Z—Z of the rotor mast, b represents the distance, projected along the axis Z—Z, from the hinge pin 28 (of the bellcrank 26 to the drive plate 29 ) to the plane of the hub 8, l is the length of the bellcrank 26 measured between the pivot pins 28 and 23 of the bellcrank 26 respectively to the drive plate 29 and to the link 21, R is the radius of attachment of the link rod 21 to the pitch change lever 20 of the cuff 18, relative to the pitch change axis X—X, i.e. the distance between the pin 22 and the axis X—X, $\gamma 0$ designates a pre-set angle of the cuff 18, the angle of rotation of which relative to the plane passing through the axes Z—Z and X—X is designated $\gamma$ (with a nil initial value), $\alpha 0$ represents the pre-set angle of the bellcrank 26, with $\alpha$ designating the angle of rotation of the bellcrank 26, i.e. the angle of inclination of the segment connecting the pins 28 and 23 of the bellcrank 26 to any plane parallel to the plane defined by the axes Z—Z and X—X (with a nil initial value of $\alpha$), so that the length L of the link rod 21 is given by the following simplified formula (1):

$$L = \sqrt{(a + l \cdot \sin(\alpha + \alpha 0) + R \cdot \sin(\gamma + \gamma 0))^2 + (l \cdot \cos(\alpha + \alpha 0) - b + R \cdot \cos(\gamma + \gamma 0))^2} \qquad (1)$$

Figure 5:
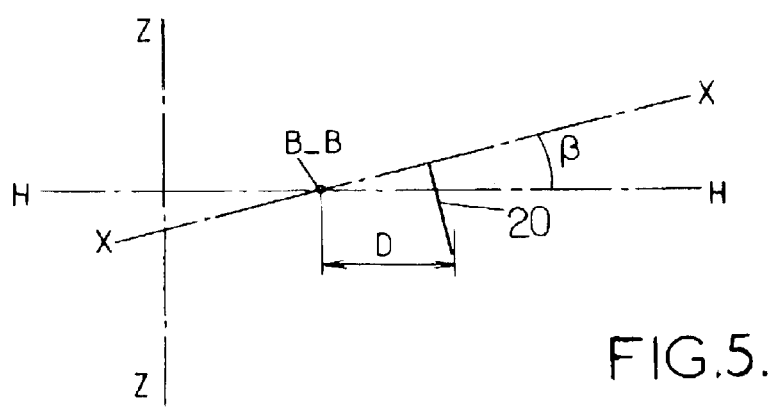
FIG. 5 is a diagram illustrating the position, in the plane defined by the rotor mast axis and the pitch change axis of a blade, of the point at which the link rod is hinged to the corresponding pitch change lever relative to the flapping axis.

If, in addition, as shown in FIG. 5, $\beta$ is the angle of flapping of the corresponding blade ($\beta$ then being the angle between the axis X—X, inclined to the axis Z—Z, and the projection on H-H of the axis X—X, perpendicularly to the axis Z—Z), and if D is the distance between the centre of the hinge of the link rod 21 to the pitch change lever 20 (i.e. the centre of the ball joint retained on the connecting pin 22 ) and the plane parallel to the axis Z—Z and containing the flapping axis B—B of the corresponding blade, the calculations show that the inclination $\psi$ of the rod 21 to any radial plane, perpendicular to the axis Z—Z, and the delta-3 relation $K\delta$ (pitch-flap relation) are expressed by the following simplified formulae (2) and (3):

$$\Psi(\alpha, \beta) := \arcsin\left[\frac{(b + D \cdot \sin(\beta) - l \cdot \cos(\alpha + \alpha 0) - R \cdot \cos(\gamma(\alpha, \beta) + \gamma 0))}{L}\right] \qquad (2)$$

$$K\delta(\alpha, \beta) := D \cdot \frac{\sin\psi(\alpha, \beta)}{R \cdot \cos(\gamma(\alpha, \beta) + \gamma 0 - \psi(\alpha, \beta))} \qquad (3)$$

Figure 6:
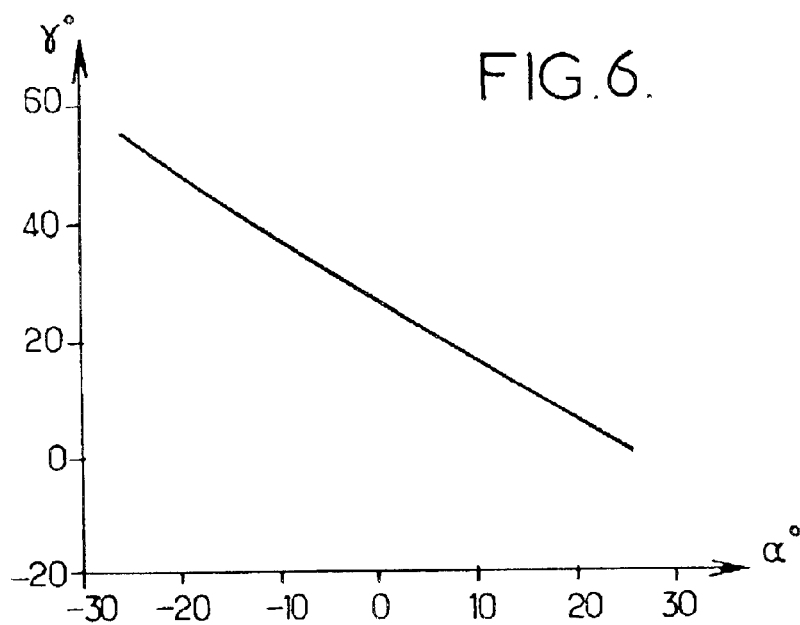
FIGS. 6 and 7 to 9 are curves showing respectively the kinematic law of the blade cuff pitch as a function of rotation, of the bellcrank (FIG. 6), and the changes in inclination of the rod (FIG. 7), of the instantaneous delta-3 value (FIG. 8), and of the cyclic delta-3 value (FIG. 9) for different values of cyclic flapping as a function of the collective pitch of a blade cuff, for a four-bladed rotor.

FIG. 6 shows the curve for variation in the pitch $\gamma$ of the cuff 18 as a function of the angle $\alpha$ of rotation of the bellcrank 26 as indicated in FIG. 4. This kinematic law corresponds to a substantially linear decrease in the pitch $\gamma$ of the cuff 18 when the angle of rotation $\alpha$ of the bellcrank 26 increases.

Figure 7:
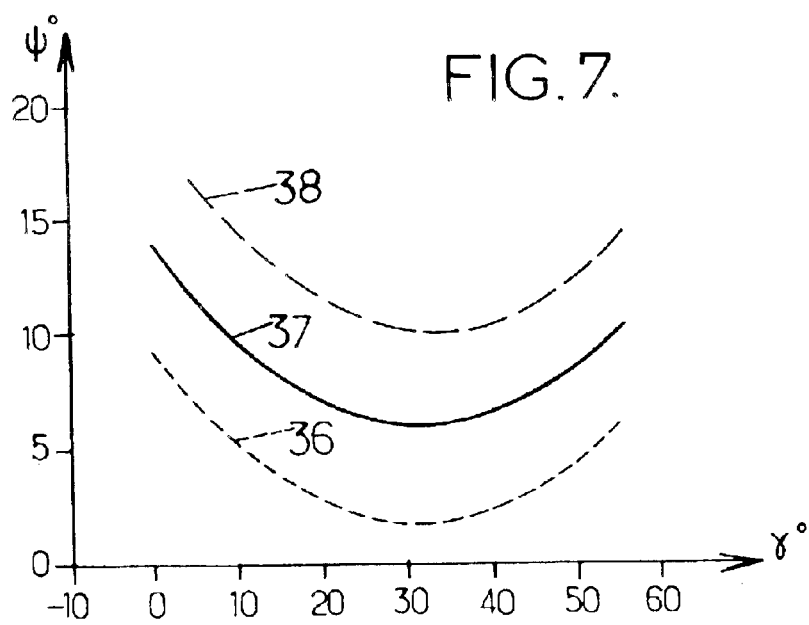

Resulting from the simplified formulae (2) and (3) is a change in the angle of inclination $\psi$ of the rod 21, for different flapping values and as a function of the collective pitch of the cuff 18, which corresponds to the substantially U-shaped curves 36, 37 and 38 in FIG. 7, in which these curves were obtained respectively with cyclic flapping of +11°, 0° and −11°.

Figure 8:
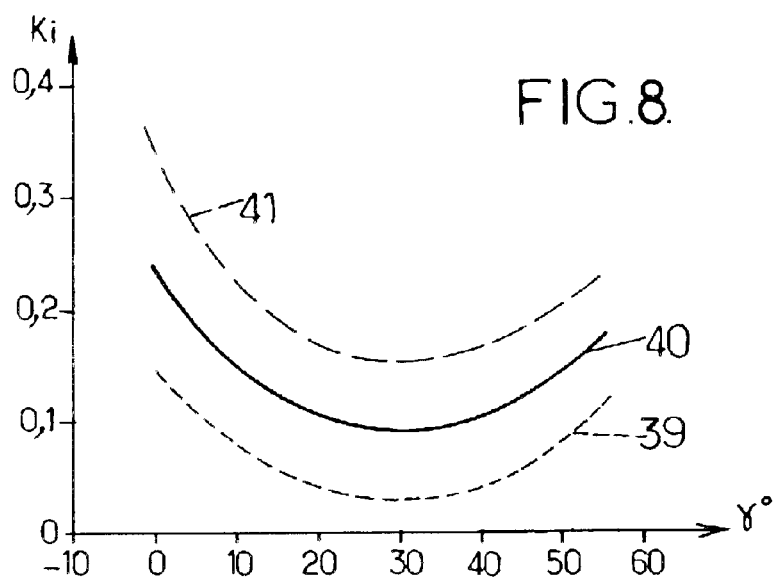

In FIG. 8, the corresponding curves 39, 40 and 41, also substantially U-shaped, represent the change in the instantaneous delta-3 relation (Ki) for different cyclic flapping values (+11°, 0°, −11°) as a function of the pitch $\gamma$ of the cuff 18. These curves 39, 40 and 41 showing the change in the instantaneous delta-3 relation are quite distinct from each other in FIG. 8.

Figure 9:
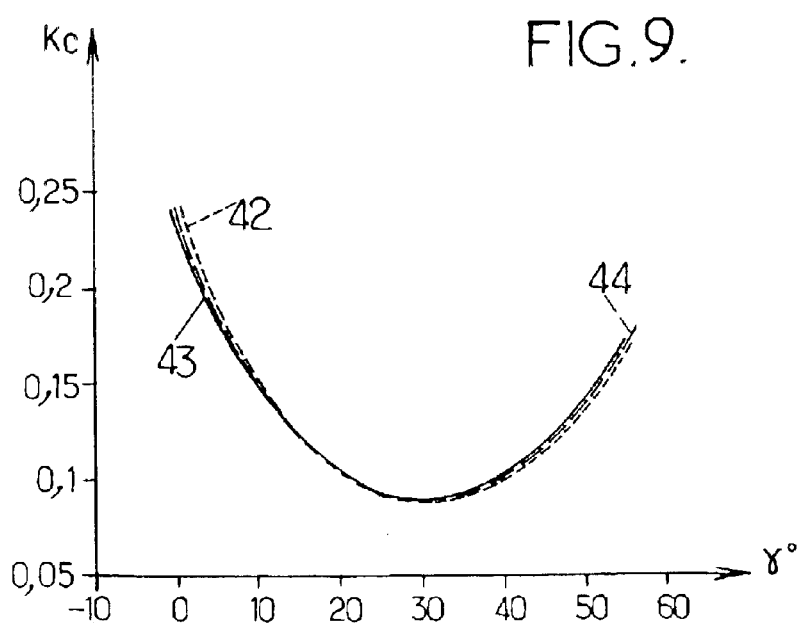

On the other hand, if we consider the change in the cyclic delta-3 relation (Kc) for different cyclic flapping values, for example the same values +11°, 0° and −11°, as a function of the pitch $\gamma$ of the cuff 18, and for the four-bladed rotor in FIGS. 2 and 3, we obtain curves 42, 43 and 44 corresponding respectively to the curves 39, 40 and 41 in FIG. 8, but which practically coincide with each other and have the same U-shaped profile, in FIG. 9.

The device for controlling blade pitch of the invention, which is fully compatible with a rotor of the gimbal type, rigid in drag, and with four blades or more, therefore easily accommodates the large cyclic flapping and the very large range of control in collective pitch which is encountered on the tilting rotors of convertible aircraft, and has the advantage of controlling the movement of the pitch change lever 20 of each blade about the pitch change axis X—X of the corresponding blade by means of a link rod 21 slightly inclined to any radial plane relative to the axis Z—Z of the rotor mast, and the slope of which relative to this plane may be chosen to correspond to the desired delta-3 relation for the rotor and, in this case, a delta-3 relation with a slightly negative value for a zero eccentricity rotor, as in the case with the rotor described above with reference to FIGS. 2 and 3, and conforming to the requirements for the delta-3 relation for the tilting rotors of convertible aircraft.

The invention has now been described in detail for the purposes of clarity of understanding. It will, however, be appreciated that certain changes and modifications may be practised within the scope of the appended claims.

What is claimed is:

1. A pitch control device for controlling pitch of blades of a rotor of a convertible aircraft, where the rotor comprises:

a rotor mast having a base and a longitudinal axis, the rotor mast being designed to be driven in rotation by said base about said longitudinal axis, a hub, driven in rotation by the mast, and connected to the mast by a tilting arrangement allowing the hub as a whole to tilt about any flapping axis passing through the axis of the mast and perpendicular to the axis of the mast, at least two blades, each of which is connected to the hub by a coupling retaining and hingeing said blade in pitch about a longitudinal pitch change axis of said blade, which pitch change axis extends in a plane of rotation of the rotor, wherein the pitch control device is external to the hub and comprises, for each blade of the rotor:

a pitch change lever integral in rotation with a root of said blade about said pitch change axis, and projecting on a side of a plane of rotation of the rotor which faces towards the base of the mast, a pitch control rod, which is movable in a direction substantially parallel to the longitudinal axis of rotation of the mast, a bellcrank, mounted so as to pivot, about a pivot pin substantially contained in a radial plane relative to the longitudinal axis of rotation of the mast, on a fixed point of a drive plate, integral in rotation with the mast, said pitch control rod being hinged to said bellcrank at least so as to pivot about a pin substantially parallel to the pivot pin of the bellcrank on the drive plate and at a point offset radially outwardly of said pivot pin relative to the longitudinal axis of rotation of the mast, and a link rod, hinged at least so as to pivot at one end on said pitch change lever, about a pin substantially parallel to said pitch change axis, and at an other end of said link rod, to the bellcrank, at a fixed point on the bellcrank situated between said plane of rotation of the rotor and the point at which the bellcrank is hinged to the drive plate, so that said link rod is slightly inclined to any radial plane relative to the longitudinal axis of rotation of the mast, and that the bellcrank converts any movement of the pitch control rod into movement of the link rod in a direction substantially transverse to the direction of the longitudinal axis of the mast.

2. A pitch control device according to claim 1, wherein said link rod remains one of substantially parallel and slightly inclined to any radial plane relative to the longitudinal axis of rotation of the mast when said blade performs angular deflection movements within a pitch range of said blade.

3. A pitch control device according to claim 1, wherein an angle of inclination of said link rod to any radial plane relative to the axis of the mast corresponds to a pitch-flap relation (delta-3 relation) desired for the corresponding blade.

4. A pitch control device according to claim 1, wherein an angle of inclination of said link rod to any radial plane, perpendicular to the longitudinal axis of the mast, varies so as to obtain pitch-flap coupling (delta-3 relation) according to a law determined as a function of pitch angle of said blade, when the blade performs angular deflection movements in flapping.

5. A pitch control device according to claim 1, wherein the bellcrank is substantially L-shaped, hinged at an elbow to the pitch change rod, at one end of one of its arms to the drive plate, and at one end of another arm to the link rod.

6. A pitch control device according to claim 1, wherein the pins pivoting the bellcrank respectively to the drive plate, to the pitch control rod, and to the link rod are substantially parallel with each other, and with the pitch change axis of its blade, in a neutral position of the hub.

7. A pitch control device according to claim 6, wherein said bellcrank and said link rod move substantially in a plane parallel to the longitudinal axis of the mast and perpendicular to the pin pivoting the bellcrank to the drive plate and substantially perpendicular to the pitch change axis of said blade.

8. A pitch control device according to claim 1, wherein said pitch change lever projects towards the base of the mast at a radially inner end, relative to the axis of the mast, of a blade cuff, rigid in torsion and connected in torsion to the root of said blade about the pitch change axis, and surrounding said coupling for retaining and hingeing said blade in pitch.

9. A pitch control device according to claim 1, wherein said bellcrank is mounted so as to pivot in a yoke projecting outwardly on the drive plate.

10. A pitch control device according to claim 1, wherein said link rod is hinged to said pitch change lever and to said bellcrank by ball joint connections.

11. A pitch control device according to claim 1, wherein said bellcrank is connected to said pitch control rod by a ball joint connection.

12. A convertible aircraft comprising at least one tilting rotor movable from a first position in which the at least one tilting rotor operates as an aeroplane propeller to a second position in which the at least one tilting rotor operates as a helicopter main lifting rotor, the at least one rotor comprising:

a rotor mast having a base and a longitudinal axis, the rotor mast being designed to be driven in rotation by said base about said longitudinal axis, a hub, driven in rotation by the mast, and connected to the mast by a tilting arrangement allowing the hub as a whole to tilt about any flapping axis passing through the axis of the mast and perpendicular to the axis of the mast, at least two blades, each of which is connected to the hub by a coupling retaining and hingeing its blade in pitch about its longitudinal pitch change axis, which extends in a plane of rotation of the rotor, a pitch control device for each blade of the rotor, each pitch control device being external to the hub and comprising:

a pitch change lever integral in rotation with a root of said blade about its pitch change axis, and projecting on a side of a plane of rotation of the rotor which faces towards the base of the mast, a pitch control rod, which is movable in a direction substantially parallel to the longitudinal axis of rotation of the mast, a bellcrank, mounted so as to pivot, about a pivot pin substantially contained in a radial plane relative to the axis of rotation of the mast, on a fixed point of a drive plate, integral in rotation with the mast, said pitch control rod being hinged to said bellcrank at least so as to pivot about a pin substantially parallel to the pivot pin of the bellcrank on the drive plate and at a point offset radially outwardly of said pivot pin relative to the longitudinal axis of rotation of the mast, and a link rod, hinged at least so as to pivot at one end on said pitch change lever, about a pin substantially parallel to said pitch change axis, and at its other end, to the bellcrank, at a fixed point on the bellcrank situated between said plane of rotation of the rotor and the point at which the bellcrank is hinged to the drive plate, so that said link rod is slightly inclined to any radial plane relative to the longitudinal axis of rotation of the mast, and that the bellcrank converts any movement of the pitch control rod into movement of the link rod in a direction substantially transverse to that of the longitudinal axis of the mast.

* * * * *